(12) United States Patent
Cheng et al.

(10) Patent No.: US 10,534,408 B2
(45) Date of Patent: Jan. 14, 2020

(54) LAPTOP COMPUTER (71) Applicant: Acer Incorporated, New Taipei (TW)

(72) Inventors: Yan-Fong Cheng, New Taipei (TW);
Cheng-Nan Ling, New Taipei (TW);
Yi-Ta Huang, New Taipei (TW);
Pao-Min Huang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/385,348

(22) Filed: Apr. 16, 2019

(65) Prior Publication Data
US 2019/0317561 A1 Oct. 17, 2019

(30) Foreign Application Priority Data

Apr. 17, 2018 (TW) .............................. 107113032 A (51) Int. Cl.
G06F 1/16 (2006.01)
(52) U.S. Cl.
CPC ............ *G06F 1/1681* (2013.01); *G06F 1/166* (2013.01); *G06F 1/1616* (2013.01)
(58) Field of Classification Search
CPC ....... G06F 1/1635; G06F 1/166; G06F 1/1683
USPC .......................... 361/679.27, 679.45, 679.55; 455/575.1–575.4
See application file for complete search history.

(56) References Cited

U.S. PATENT DOCUMENTS

| 5,251,102 A | * | 10/1993 | Kimble | ................. G06F 1/1616 361/679.09 |
| 5,477,129 A | * | 12/1995 | Myslinski | ............. G06F 1/1616 320/DIG. 21 |
| 5,719,799 A | * | 2/1998 | Isashi | .................... G06F 1/1618 345/169 |
| 5,841,630 A | * | 11/1998 | Seto | ....................... G06F 1/1616 361/679.58 |
| 6,073,187 A | * | 6/2000 | Jacobs | .................. G06F 1/1616 361/679.27 |
| 6,094,341 A | * | 7/2000 | Lin | ........................ G06F 1/1616 345/905 |
| 6,154,359 A | * | 11/2000 | Kamikakai | ........... G06F 1/1618 16/342 |

(Continued)

FOREIGN PATENT DOCUMENTS

| CN | 2919346 Y | 7/2007 |
| TW | 201228581 A | 7/2012 |

(Continued)

OTHER PUBLICATIONS

Chinese language office action dated Jan. 25, 2019, issued in application No. TW 107113032.

*Primary Examiner* — Adrian S Wilson
(74) *Attorney, Agent, or Firm* — McClure, Qualey & Rodack, LLP (57) ABSTRACT A laptop computer includes a host, a hinge mechanism, and a display. The host includes a housing, a pivoting base, and a protection cover that pivots on the pivoting base. The hinge mechanism is connected to the host, and includes a first shaft disposed in the housing, and a connection element connected to the first shaft. The display is connected to the hinge mechanism. When the display is rotated about the host, the connection element is rotated following the first shaft and makes the protection cover rotating relative to the housing.

10 Claims, 9 Drawing Sheets (56) References Cited

U.S. PATENT DOCUMENTS

| | | | | |
|---|---|---|---|---|
| 6,191,941 B1 * | 2/2001 | Ito | | G06F 1/1616 |
| | | | | 361/679.27 |
| 6,307,740 B1 * | 10/2001 | Foster | | G06F 1/1616 |
| | | | | 361/679.1 |
| 6,341,061 B1 * | 1/2002 | Eisbach | | G06F 1/1616 |
| | | | | 312/223.2 |
| 6,353,529 B1 * | 3/2002 | Cies | | G06F 1/1616 |
| | | | | 248/917 |
| 6,392,871 B1 * | 5/2002 | Yanase | | G06F 1/162 |
| | | | | 345/905 |
| 6,430,038 B1 * | 8/2002 | Helot | | G06F 1/1616 |
| | | | | 248/917 |
| 6,459,573 B1 * | 10/2002 | DiStefano | | G06F 1/203 |
| | | | | 361/679.46 |
| 6,612,668 B2 * | 9/2003 | Doan | | G06F 1/1616 |
| | | | | 16/303 |
| 6,687,119 B2 * | 2/2004 | Lai | | G06F 1/1616 |
| | | | | 361/679.09 |
| 6,707,666 B1 * | 3/2004 | Chuang | | G06F 1/1616 |
| | | | | 16/342 |
| 7,286,861 B2 * | 10/2007 | Woo | | H04B 1/38 |
| | | | | 379/433.13 |
| 7,353,050 B2 * | 4/2008 | Im | | H04M 1/022 |
| | | | | 379/433.12 |
| 7,630,195 B2 * | 12/2009 | Lin | | G06F 1/203 |
| | | | | 361/679.26 |
| 7,864,524 B2 * | 1/2011 | Ladouceur | | G06F 1/1616 |
| | | | | 361/679.55 |
| 7,894,184 B2 * | 2/2011 | Huang | | G06F 1/1616 |
| | | | | 361/679.11 |
| 8,208,249 B2 * | 6/2012 | Chin | | G06F 1/1618 |
| | | | | 361/679.27 |
| 8,542,486 B2 * | 9/2013 | Lin | | G06F 1/203 |
| | | | | 174/547 |
| 8,937,806 B2 * | 1/2015 | Senatori | | H05K 7/20127 |
| | | | | 165/104.33 |
| 9,104,374 B2 * | 8/2015 | Tsai | | G06F 1/1616 |
| 9,740,253 B2 * | 8/2017 | Cheng | | G06F 1/203 |
| 9,864,435 B2 | 1/2018 | Okuley | | |
| 9,939,851 B2 | 4/2018 | Lan et al. | | |
| 10,289,176 B1 * | 5/2019 | Chen | | G06F 1/203 |
| 2002/0012228 A1 * | 1/2002 | Ozaki | | G06F 1/203 |
| | | | | 361/679.48 |
| 2004/0264118 A1 * | 12/2004 | Karidis | | G06F 1/1616 |
| | | | | 361/679.55 |
| 2005/0099533 A1 * | 5/2005 | Matsuda | | H04M 1/0218 |
| | | | | 348/375 |
| 2007/0247799 A1 | 10/2007 | Nie et al. | | |
| 2009/0190295 A1 * | 7/2009 | Chin | | G06F 1/1618 |
| | | | | 361/679.27 |
| 2011/0075352 A1 * | 3/2011 | Tye | | G06F 1/203 |
| | | | | 361/679.46 |

FOREIGN PATENT DOCUMENTS

| | | |
|---|---|---|
| TW | 201337511 A | 9/2013 |
| TW | 201720275 A | 6/2017 |

\* cited by examiner

LAPTOP COMPUTER

CROSS-REFERENCE TO RELATED APPLICATIONS

This Application claims priority of Taiwan Patent Application No. 107113032 filed on Apr. 17, 2018, the entirety of which is incorporated by reference herein.

BACKGROUND OF THE INVENTION

Field of the Invention

The present disclosure relates to a laptop computer, and in particular to a laptop computer with a hinge mechanism and a protection cover.

Description of the Related Art

A conventional laptop computer includes a host, a display, and a hinge mechanism. The display can be rotated relative to the host via the hinge mechanism. Moreover, the display can maintain its tilt relative to the host because of the hinge mechanism, providing the user with easy viewing of the display.

However, due to laptop computers becoming thinner, the space essential for heat dissipation in a laptop computer, as well as the size of the heat dissipation structure and the fan, are increasingly being limited. Therefore, a better design is needed to improve the heat dissipation efficiency of the laptop computer. Moreover, the requirements for laptop computers are getting higher and higher, and laptop computers that can provide better functions are needed.

Although existing laptop computers have been generally adequate for their intended purposes, they have not been entirely satisfactory in all respects. Consequently, it would be desirable to provide a solution for improving laptop computers.

BRIEF SUMMARY OF THE INVENTION

The disclosure provides a laptop computer. The hinge mechanism can be well integrated into the display and the host, and can enhance the functioning of the laptop computer and heat dissipation.

The disclosure provides a laptop computer that includes a host, a hinge mechanism and a display. The host includes a housing, a pivoting base disposed in the housing, and a protection cover that pivots on the pivoting base. The hinge mechanism is connected to the host, and includes a first shaft disposed in the housing and a connection element connected to the first shaft. The display is connected to the hinge mechanism, and is rotatable relative to the host via the hinge mechanism. When the display is rotated relative to the host, the connection element is rotated with the first shaft, so as to make the protection cover rotate relative to the housing.

In some embodiments, the laptop computer further includes an electronic device disposed on the protection cover, and located in the housing.

In some embodiments, the protection cover includes a light hole, and the electronic device includes a camera module corresponding to the light hole.

In some embodiments, the laptop computer further includes a frame disposed on the protection cover. The electronic device is located between the frame and the protection cover.

In some embodiments, while the display is moving from a covered position to an open position, an angle of inclination between the protection cover and the housing is gradually increased. While the display is moving from the open position to the covered position, the angle of inclination between the protection cover and the housing is gradually decreased.

In some embodiments, when the display is in the covered position, the protection cover covers the opening in the housing. When the display is in the open position, the protection cover is inclined relative to the housing, and the opening is exposed between the protection cover and the housing.

In some embodiments, the host further includes a base disposed in the housing, and has a curved groove. The hinge mechanism further includes a rotation element comprising a curved portion in the curved groove; and a second shaft connected to the connection element and the rotation element, and extending parallel to the first shaft. When the display is rotated relative to the host, the curved portion is rotated relative to the curved groove along a curved path.

In some embodiments, the curved path is a circular path, and the curved groove and the curved portion are C-shaped.

In some embodiments, the hinge mechanism further includes a fixed element that pivots on the first shaft, and is affixed to the housing; and torque elements disposed on the first shaft, and configured to provide a torque force between the first shaft and the fixed element.

In some embodiments, the laptop computer further includes a first curved cover connected to the rotation element; a second curved cover connected to the rotation element, wherein a gap is formed between the first curved cover and the second curved cover; and a transmission wire connected to the host and the display, and located in the gap.

In conclusion, the present disclosure integrates the host and the display using a hinge mechanism, so that the display can rotate relative to the host. When the display is in the open position, the protection cover is inclined relative to the housing, and the opening of the housing is exposed between the protection cover and the housing, and thus the heat dissipation efficiency of the host can be improved. Moreover, an electronic device can be disposed on the protection cover so as to add external functions to the host.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

Spatially relative terms, such as upper and lower, may be used herein for ease of description to describe one element or feature's relationship to other elements or features as illustrated in the figures. The spatially relative terms are intended to encompass different orientations of the device in a use position or operation in addition to the orientation depicted in the figures. Moreover, the shape, size, and thickness depicted in the drawings may not be drawn to scale or may be simplified for clarity of discussion; these drawings are merely intended for illustration.

Figure 1:
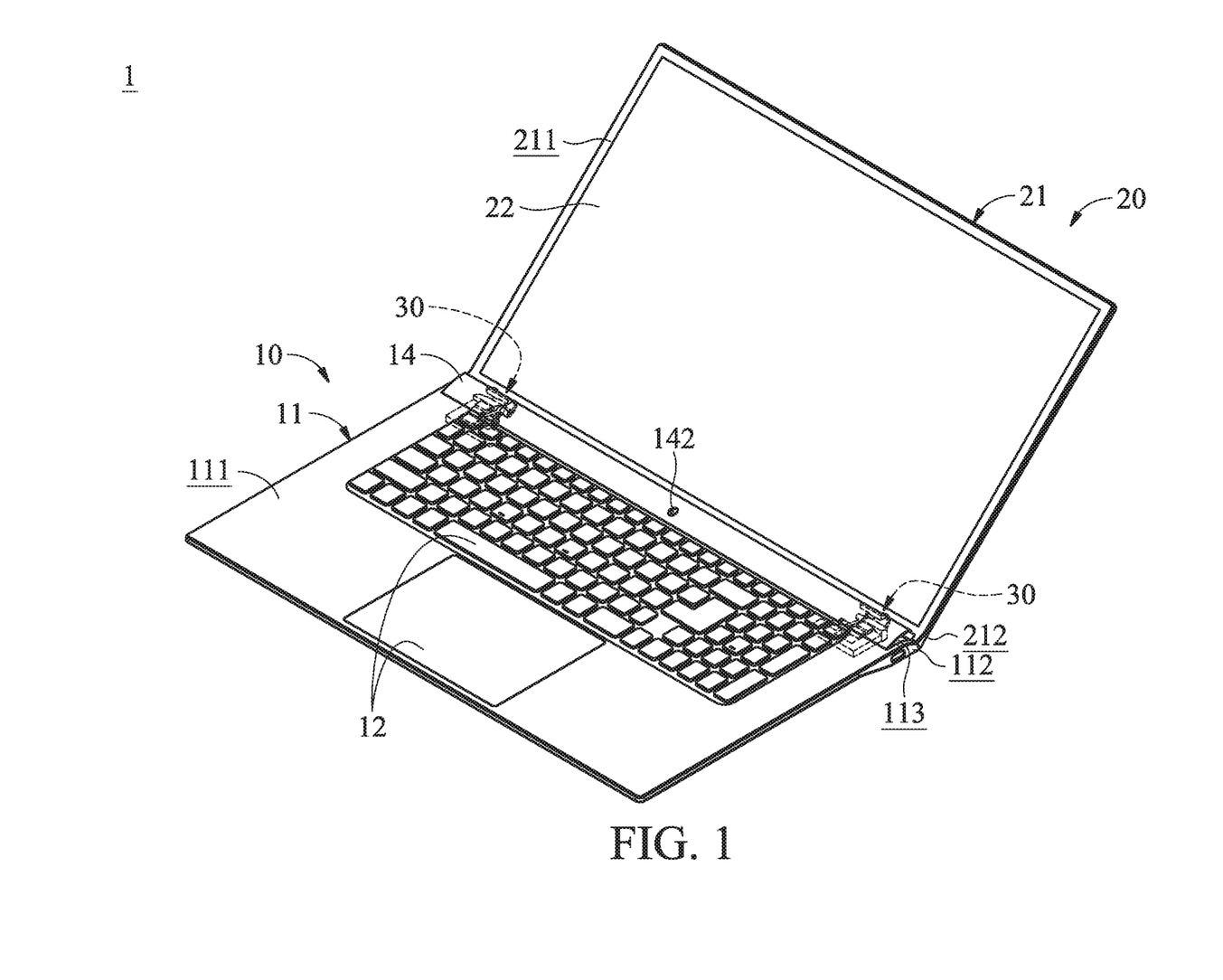
FIG. 1 is a perspective view of a laptop computer in accordance with some embodiments of the disclosure, wherein the laptop computer is in an open position.
Figure 2:
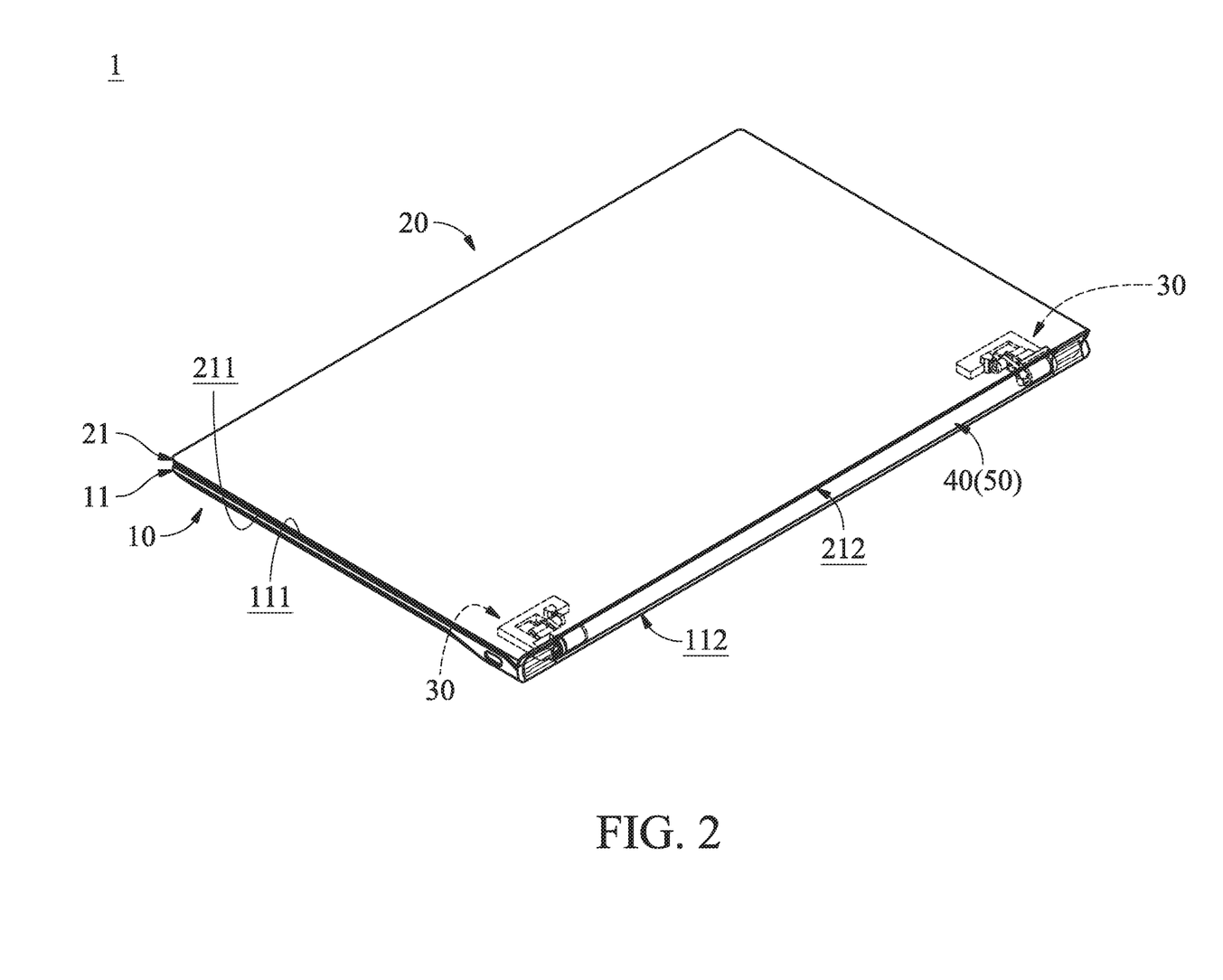
FIG. 2 is a perspective view of the laptop computer in accordance with some embodiments of the disclosure, wherein the laptop computer is in a closed position.

FIG. 1 is a perspective view of a laptop computer 1 in accordance with some embodiments of the disclosure, wherein the laptop computer 1 is in an open position. FIG. 2 is a perspective view of the laptop computer 1 in accordance with some embodiments of the disclosure, wherein the laptop computer 1 is in a closed position. The laptop computer 1 includes a host 10, a display 20, hinge mechanisms 30. The host 10 may be a plate structure.

The host 10 includes a housing 11 and operation devices 12. The housing 11 may be a plate structure. The operation device 12 is disposed on the operation surface 111 of the housing 11. The operation device 12 is configured to generate operation signals according to user's operation. The operation device 12 may be a keyboard, a touchpad, and/or a touch panel. The host 10 may further include a processor, a motherboard, a memory, and/or a storage device (not shown in figures) disposed in the housing 11.

The display 20 pivots on the host 10 via the hinge mechanism 30. In other words, the display 20 rotates relative to the host 10 via the hinge mechanism 30. The display 20 may be a plate structure connected to the host 10. In some embodiments, the display 20 is a touch display.

The display 20 includes a display housing 21 and a display panel 22. The display panel 22 is disposed on the display surface 211 of the display housing 21. In some embodiments, the display panel 22 may be a touch display panel. The display panel 22 is configured to display an image. In some embodiments, the host 10 generates display signals according to the operation signals, and transmits the display signals to the display 20. The display 20 displays an image according to the display signals.

As shown in FIG. 1, when the display 20 is in an open position, the display 20 is inclined relative to the host 10. In some embodiments, the angle between the display 20 and the host 10 is greater than 90 degrees and less than 180 degrees. Moreover, the display surface 211 is inclined relative to the operation surface 111.

As shown in FIG. 2, when the display 20 is in a covered position, the display 20 covers the host 10, the display 20 may be contact with or substantially parallel to the host 10. In some embodiments, the angle between the display 20 and the host 10 is less than 10 degrees. Moreover, the display surface 211 covers the operation surface 111 of the housing 11, and the display surface 211 may be in contact with or substantially parallel to the operation surface 111.

As shown in FIGS. 1 and 2, the hinge mechanism 30 is connected to the host 10 and the display 20. The hinge mechanism 30 is located at the rear side 112 of the housing 11 and the rear side 212 of the display housing 21.

Figure 3:
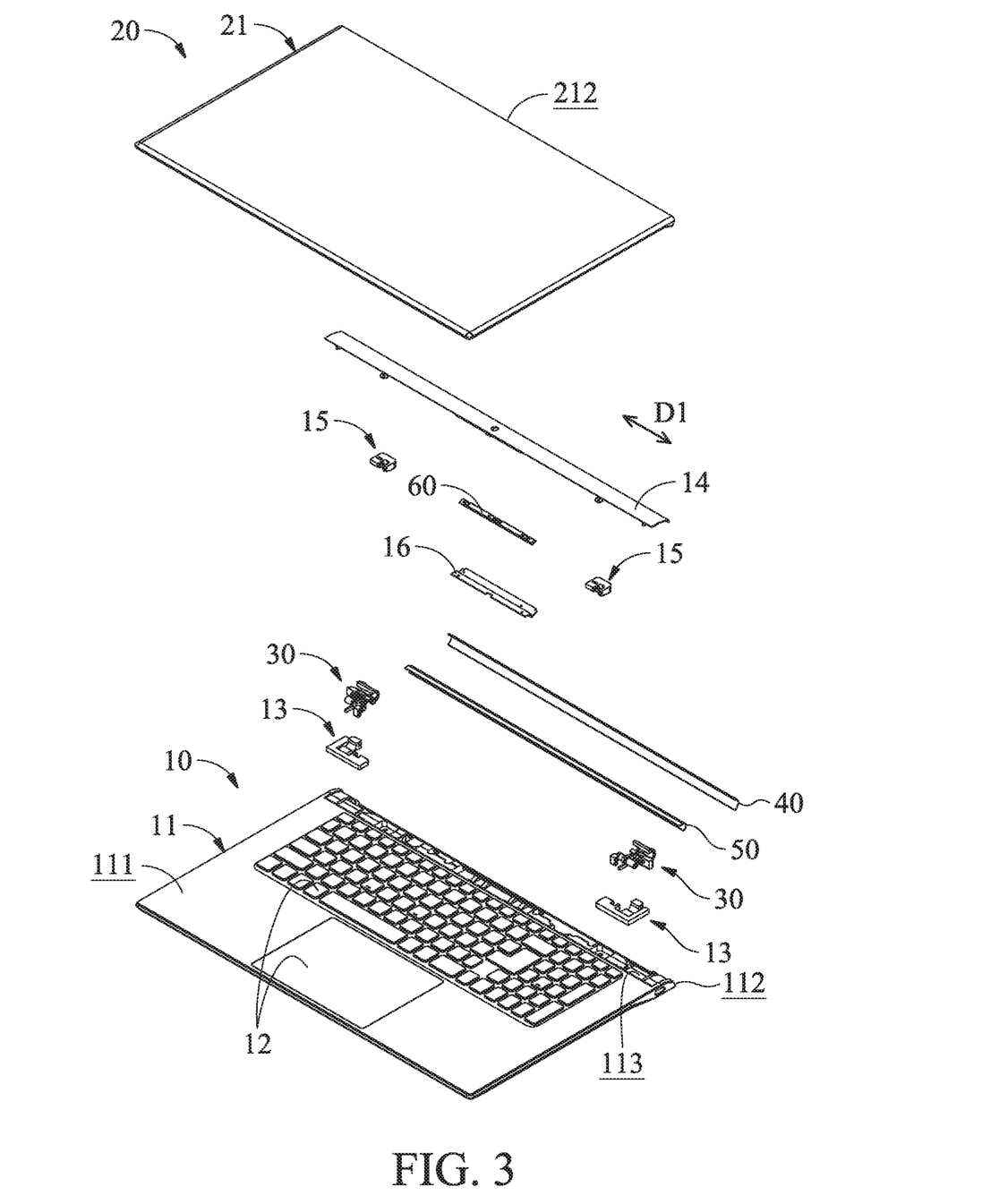
FIG. 3 is an exploded view of the laptop computer in accordance with some embodiments of the disclosure.
Figure 4A:
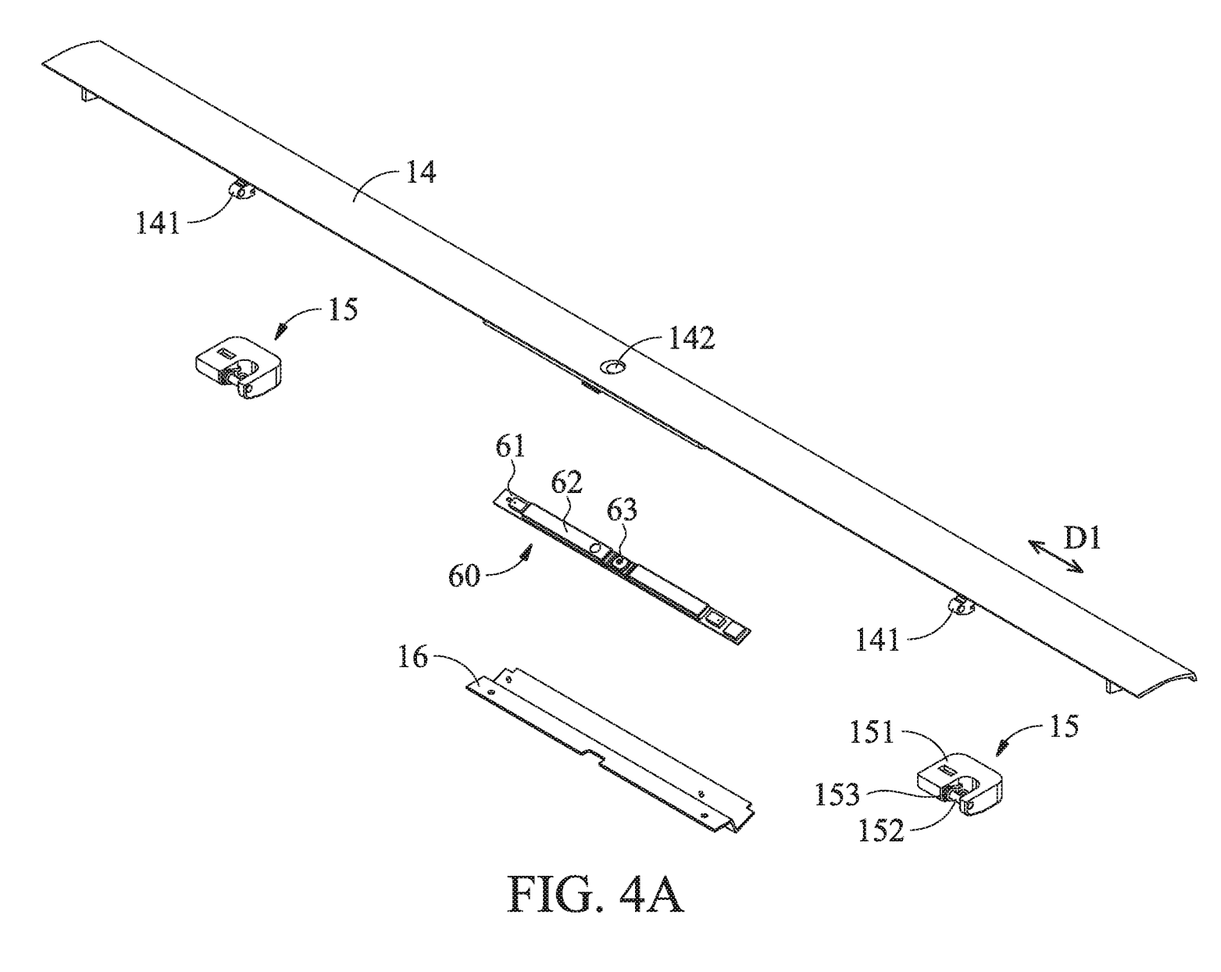
FIG. 4A is an exploded view of the protection cover and the frame in accordance with some embodiments of the disclosure.
Figure 4B:
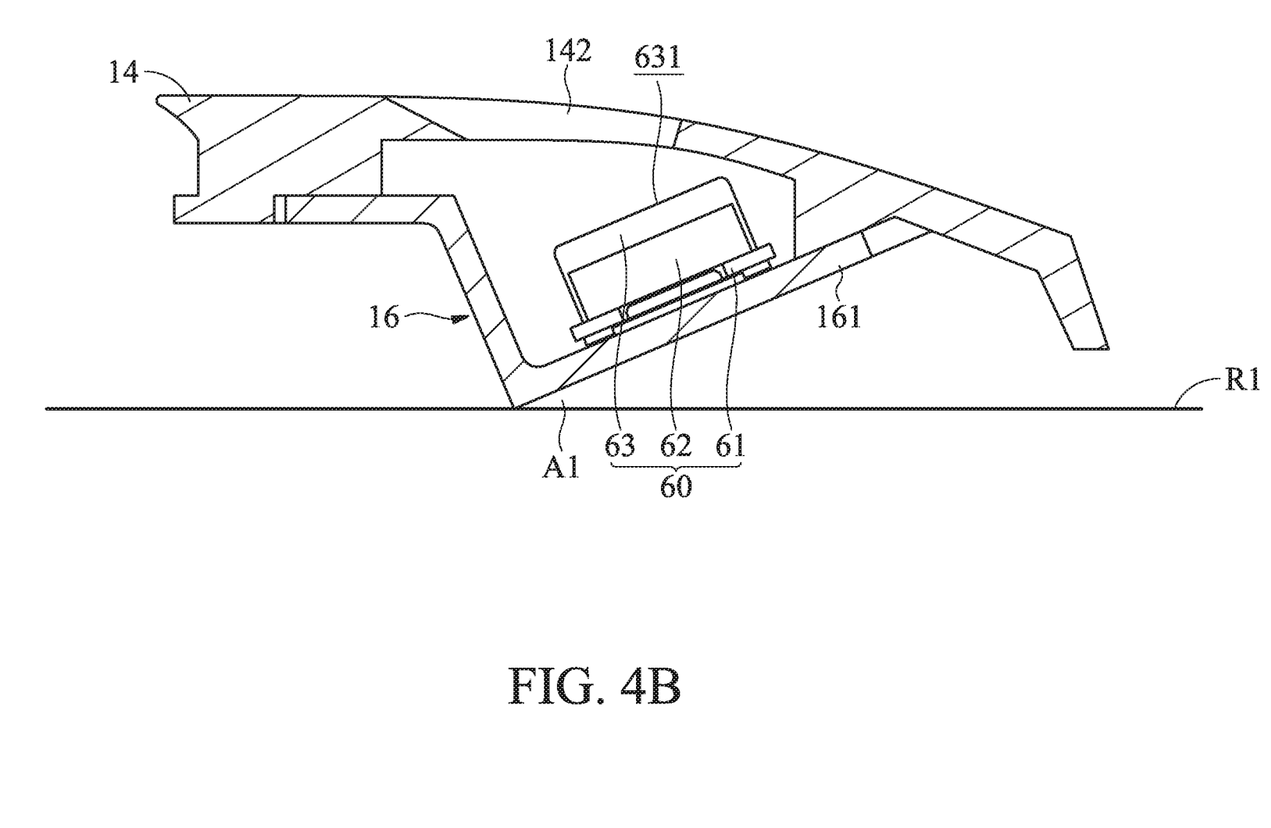
FIG. 4B is a cross-sectional view of protection cover and the frame in accordance with some embodiments of the disclosure.

FIG. 3 is an exploded view of the laptop computer 1 in accordance with some embodiments of the disclosure. FIG. 4A is an exploded view of the protection cover 14 and the frame 16 in accordance with some embodiments of the disclosure. FIG. 4B is a cross-sectional view of protection cover 14 and the frame 16 in accordance with some embodiments of the disclosure. The host 10 further includes a protection cover 14 and a pivoting base 15. The protection cover 14 pivots on the pivoting base 15. The protection cover 14 may be an elongated structure, which extends in an extension direction D1. The pivoting base 15 is disposed in the housing 11. In some embodiments, the base 13 and housing 11 are formed as a single piece.

In this embodiment, the pivoting base 15 includes a pivoting body 151, a pivoting portion 152, and an elastic element 153. The pivoting portion 152 may be a cylindrical structure, which extends in the extension direction D1. The elastic element 153 is disposed on the pivoting portion 152, and connected to the protection cover 14. In some embodiments, the elastic element 153 may be a torque spring.

The protection cover 14 includes a pivoting portion 141, which pivots on the pivoting portion 152 of the pivoting base 15. In some embodiments, the elastic element 153 is connected to the pivoting portion 141, and configured to provide a torque force to the protection cover 14. The torque force is configured to return the protection cover 14 to a covered position.

As shown in FIG. 3, the display 20 and the protection cover 14 are in the covered position. The protection cover 14 covers an opening 113 of the housing 11. The protection cover 14 may be located at the extension of the operation surface of the housing 11. As shown in FIG. 1, the display 20 and the protection cover 14 are in the open position. The protection cover 14 is inclined relative to the housing 11 (or the extension of the operation surface 111), and the opening 113 of the housing 11 is exposed between the protection cover 14 and the housing 11. Therefore, due to the protection cover 14, the heat in the host can be exhausted from the opening 113, so as to increase the heat dissipation efficiency of the laptop computer 1.

The host 10 further includes a frame 16 disposed on the protection cover 14. The frame 16 extends in the extension direction D1, and the frame 16 is located between the protection cover 14 and the housing 11. When the display 20 and the protection cover 14 are in the covered position, the frame 16 is located in the housing 11. When the display 20 and the protection cover 14 are in the open position, the frame 16 is located between the protection cover 14 and the opening 113.

The laptop computer 1 further includes an electronic device 60 disposed on the protection cover 14, and located in the housing 11. In this embodiment, the electronic device 60 is located between the frame 16 and the protection cover 14. In some embodiments, the electronic device 60 is detachably affixed to the frame 16, and the frame 16 is fastened on the protection cover by a screw.

In some embodiments, the electronic device 60 includes a circuit board 61, electronic elements 62, and a camera module 63. The circuit board 61 is disposed on the frame 16, and the electronic element 62 and the camera module 63 may be disposed on the circuit board 61. The protection cover 14 includes a light hole 142, and the camera module 63 is adjacent to and corresponds to the light hole 142. In some embodiments, the electronic element 62 includes resistors, capacitors, chips, microphones, speakers, and/or antennas.

In the disclosure, when the laptop computer 1 is in the open position, the speaker can be made to face the user directly by tilting the protection cover 14, and thus the sound quality of the laptop computer 1 can be improved. Moreover, the microphone can be made to face the user directly by tilting the protection cover 14, and thus the recording quality of the laptop computer 1 can be improved.

As shown in FIG. 4B, the frame 16 further includes an inclined portion 161, which is inclined relative to a reference plane R1. The reference plane R1 substantially extends along the housing 11 in FIG. 2. In some embodiments, the reference plane R1 may be a horizontal plane. When the display 20 covers the host 10, the host is put on the reference plane R1. In some embodiments, the angle A1 between the inclined portion 161 and the reference plane R1 is in a range from about 40 degrees to 50 degrees. Since the camera module 63 is disposed on the inclined portion 161, the extension of the incident surface 631 of the camera module 63 is inclined relative to the reference plane R1. Therefore, by the structure of the frame 16, the camera module 63 can capture the user well when the protection cover 14 is in the open position.

Figure 5:
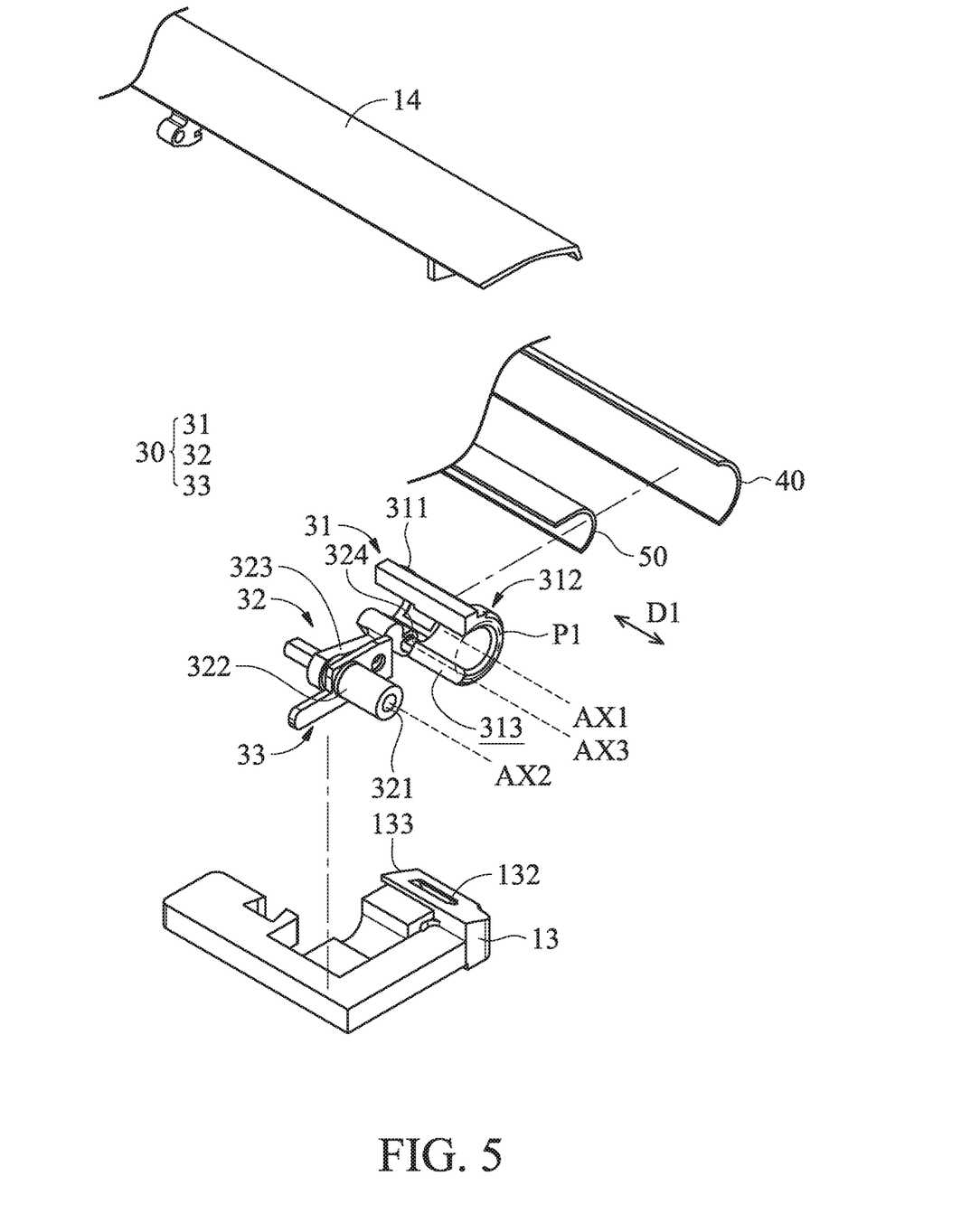
FIG. 5 is a perspective view of the hinge mechanism in accordance with some embodiments of the disclosure.
Figure 6:
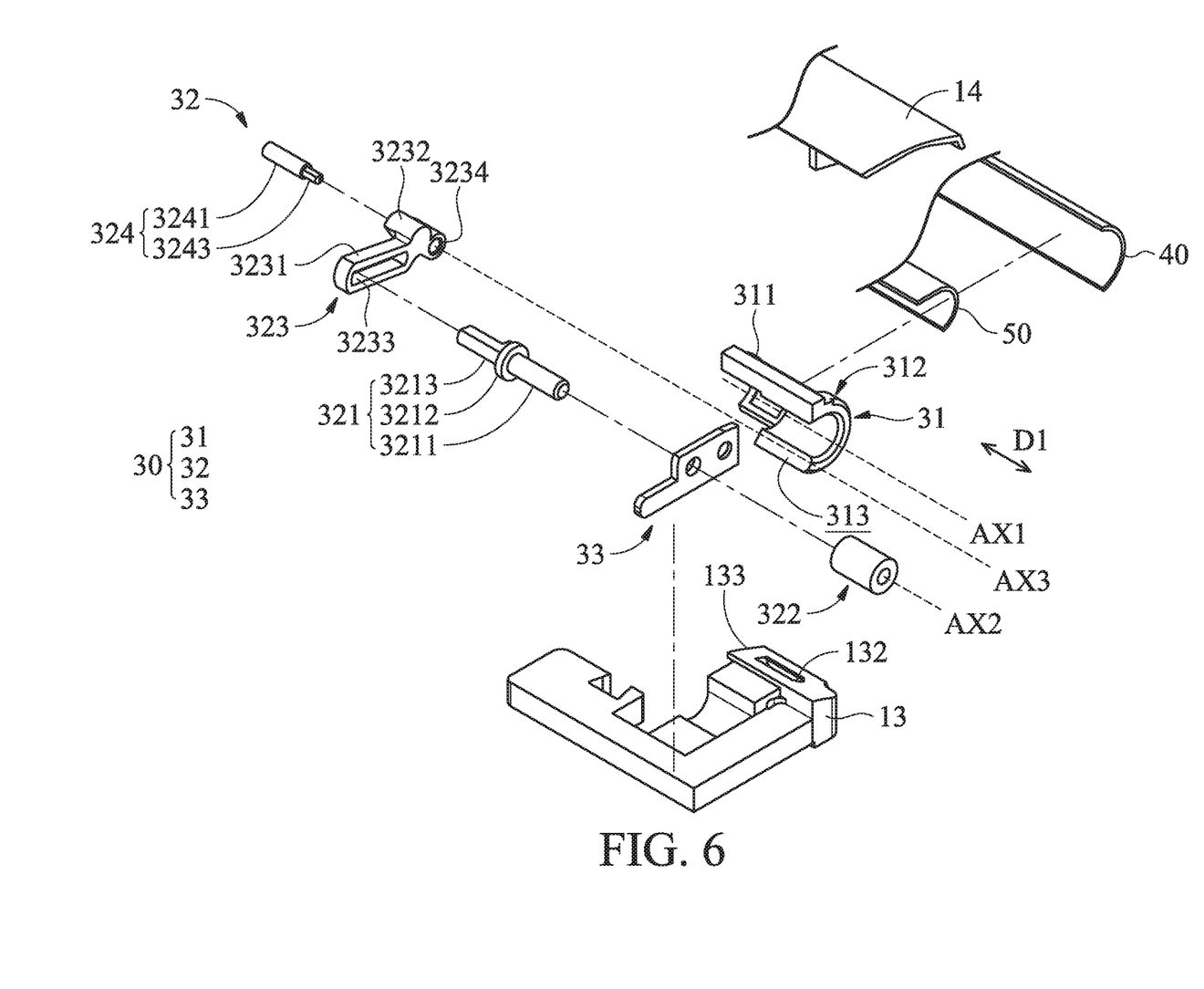
FIG. 6 is an exploded view of the hinge mechanism in accordance with some embodiments of the disclosure.
Figure 7A:
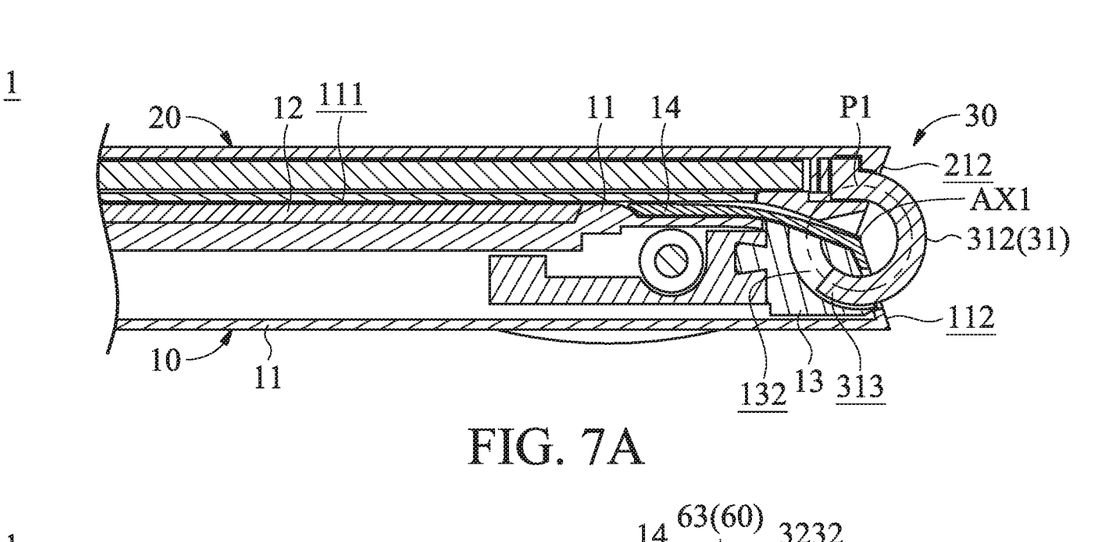
FIG. 7A and FIG. 7B are schematic views of the laptop computer in accordance with some embodiments of the disclosure, wherein the laptop computer is in the closed position.
Figure 7B:
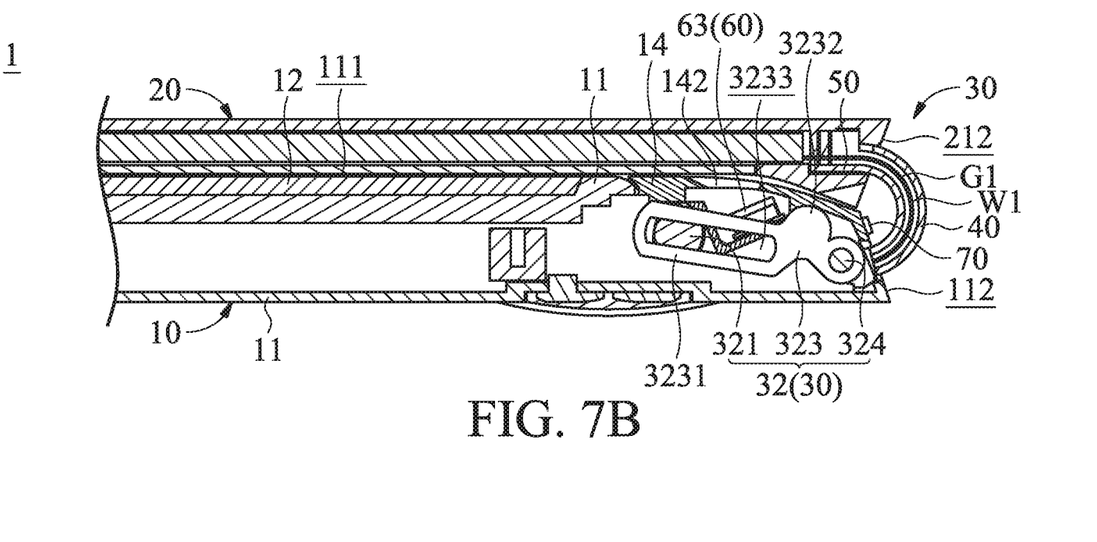

FIG. 5 is a perspective view of the hinge mechanism 30 in accordance with some embodiments of the disclosure. FIG. 6 is an exploded view of the hinge mechanism 30 in accordance with some embodiments of the disclosure. FIG. 7A and FIG. 7B are schematic views of the laptop computer 1 in accordance with some embodiments of the disclosure. In FIGS. 5 to 7B, the laptop computer 1 is in a closed state.

The host 10 further includes a base 13 disposed in the housing 11. The base 13 further includes a curved groove 132 (as shown in FIG. 7A). The base 13 may be fastened in the housing 11 via fastening elements (not shown in figures). In some embodiments, the base 13 and the housing 11 are formed as a single piece.

The hinge mechanism 30 includes a rotation element 31, a torque assembly 32, and a fixed element 33. The rotation element 31 is affixed to the display 20 and rotated relative to the curved groove 132. The rotation element 31 includes a rotation body 311 and a curved portion 312.

The rotation body 311 is affixed to the rear side 212 of the display 20. The curved portion 312 is connected to the rotation body 311. In some embodiments, the rotation body 311 and the curved portion 312 are formed as a single piece. The curved portion 312 is located in the curved groove 132. As shown in FIG. 7A, when the display 20 is rotated relative to the host 10, the curved portion 312 is rotated relative to the curved groove 132 along a curved path P1. In this embodiment, the curved groove 132 and the curved portion 312 are C-shaped.

In some embodiments, the curved path P1 is a circular path. A main axis AX1 passes through the center of the curved path P1. The curved path P1 is located on a plane that is perpendicular to the main axis AX1, and the extension direction D1 is parallel to the main axis AX1. In this embodiment, the curved portion 312 is rotated relative to the curved groove 132 about the main axis AX1. In other words, the display 20 is rotated relative to the host 10 about the main axis AX1.

The torque assembly 32 is connected to the rotation element 31 and the fixed element 33. The torque assembly 32 is configured to apply a torque force between the host 10 and the display 20. The torque assembly 32 includes a first shaft 321, a torque element 322, a connection element 323, and a second shaft 324.

The first shaft 321 is connected to the connection element 323 and the fixed element 33. The first shaft 321 extends along a first axis AX2. The first axis AX2 is parallel to the main axis AX1. In this embodiment, the first shaft 321 pivots on the fixed element 33. The first shaft 321 may be rotated relative to the fixed element 33 about the first axis AX2. Moreover, the first shaft 321 is rotated with the connection element 323.

The first shaft 321 includes a first pivoting portion 3211, a first blocking portion 3212, and a first retaining portion 3213. The first pivoting portion 3211 may be a circular cylinder, passing through the fixed element 33. The first blocking portion 3212 is connected to the first pivoting portion 3211 and the first retaining portion 3213. The first retaining portion 3213 passes through the connection element 323.

The torque element 322 is disposed on the first pivoting portion 3211 of the first shaft 321, and configured to apply a first torque force between the first shaft 321 and the fixed element 33. The fixed element 33 is clamped between the torque element 322 and the first blocking portion 3212. The torque element 322 may be ring-like element, and the first pivoting portion 3211 may pass through the center of the torque element 322.

The connection element 323 is disposed on the first retaining portion 3213 of the first shaft 321, and abuts the first blocking portion 3212. The connection element 323 may extend perpendicular to the first axis AX2. In other words, the connection element 323 may be perpendicular to the first shaft 321.

The connection element 323 has a first connection hole 3231 and a second connection hole 3232. The abutting portion 3232 is disposed on the connection body 3231. In some embodiments, the connection body 3231 and the abutting portion 3232 are formed as a single piece. The abutting portion 3232 is adjacent to the protection cover 14, and configured to move the protection cover 14 from the covered position to the open position.

The connection body 3231 has a first connection hole 3233 and a second connection hole 3234. The first retaining portion 3213 of the first shaft 321 passes through the first connection hole 3233, and is moved along the first connection hole 3233. Moreover, the first connection hole 3233 can limit the rotation of the connection element 323 relative to the first retaining portion 3213. In other words, the connection element 323 cannot be rotated relative to the first shaft 321.

In some embodiments, the longest length of the first connection hole 3233 is longer than 1.1 times the longest width of the first shaft 321. The longest length and the longest width are measured in the same direction, which is perpendicular to the first axis AX2.

In some embodiments, the longest width of the first connection hole 3233 is substantially equal to the greatest thickness of the first shaft 321. The longest width and the greatest thickness are measured in the same direction perpendicular to the first axis AX2.

The second shaft 324 is connected to the connection element 323 and the rotation element 31, and extends parallel to the first shaft 321. In this embodiment, the second shaft 324 extends along a second axis AX3. The second axis AX3 is parallel to the first axis AX2 and the main axis AX1.

The second shaft 324 includes a second pivoting portion 3241 and a second retaining portion 3243. The second pivoting portion 3241 pivots on the connection element 323, and passes through the second connection hole 3234. In other words, the second shaft 324 is rotatable relative to the connection element 323. In this embodiment, the connection element 323 applies a second torque to the second shaft 324.

The second retaining portion 3243 is connected to the second pivoting portion 3241 and to the curved portion 312. In this embodiment, the second retaining portion 3243 is affixed to the connection end 313 of the curved portion 312, and the second shaft 324 is rotated and moved with the curved portion 312. In some embodiments, the second shaft 324 cannot be rotated relative to the curved portion 312.

The fixed element 33 is connected to the torque assembly 32, and affixed to the housing 11. In this embodiment, the fixed element 33 is affixed to the base 13. The fixed element 33 includes a first plate 331 and a second plate 332. The first plate 331 extends along a plane that is perpendicular to the first axis AX2. In other words, the first plate 331 is perpendicular to the first shaft 321. The second plate 332 extends perpendicular to first plate 331.

As shown in FIGS. 7A and 7B, the laptop computer 1 is in a closed position, and the display 20 covers the host 10. Moreover, the connection end 313 of the curved portion 312 of the rotation element 31 is located in the curved groove 132 of the base 13. The protection cover 14 of the housing 11 is located on the extension of the operation surface 111 of the housing 11. The electronic device 60 is located in the housing 11. Therefore, the display 20 can be well covered on the host 10.

Figure 8:
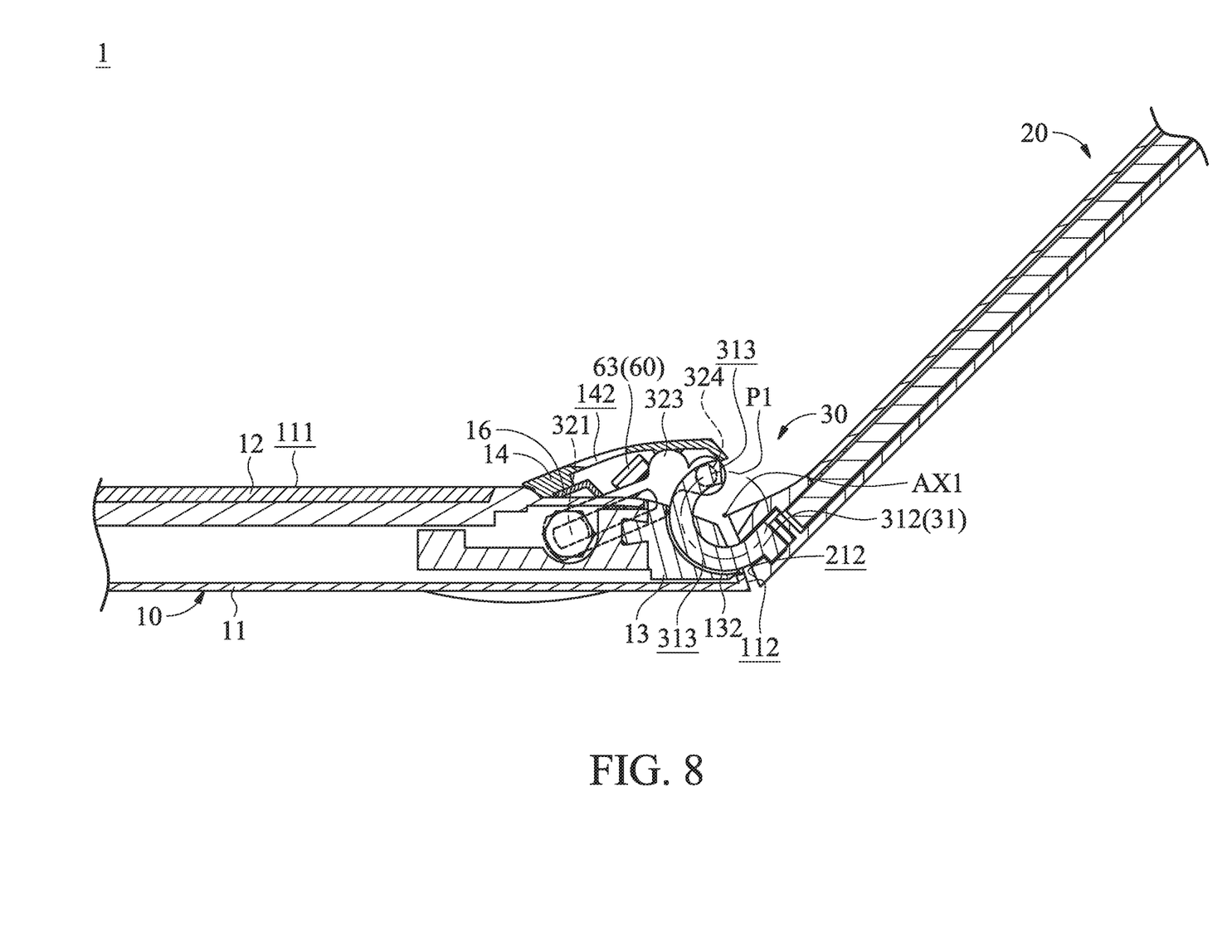
FIG. 8 is a schematic view of the laptop computer in accordance with some embodiments of the disclosure, wherein the laptop computer is in the open position.

FIG. 8 is a schematic view of the laptop computer 1 in accordance with some embodiments of the disclosure, wherein the laptop computer 1 is in an open position. The display 20 is rotated relative to the host 10, so as to make the display 20 to be inclined relative to the host 10. Moreover, the connection end 313 leaves the curved groove 132, and is exposed from the base 13. The connection end 313 is moved with the second shaft 324. In addition, the second shaft 324 is rotated with the connection element 323 about the first shaft 321.

When the laptop computer 1 is in the open position, the connection end 313 and the abutting portion 3232 of the connection element 323 protrude from the operation surface 111 of the housing 11. The abutting portion 3232 of the connection element 323 pushes the protection cover 14 to be inclined relative to the operation surface 111.

While the display 20 is moving from the open position to the covered position, the abutting portion 3232 is moved from the position shown in FIG. 8 to the position shown in FIG. 7B. Moreover, the protection cover 14 can return to the covered position by its own gravity and the torque force applied by the elastic element 153 in FIG. 4A.

Accordingly, in this embodiment, when the display 20 is rotated relative to the host 10, the connection element 323 is rotated with the first shaft 321, so as to make the protection cover 14 rotate relative to the housing 11. As shown in FIGS. 7A, 7B and 8, while the display 20 is moved from the covered position to the open position, the angle of inclination between the protection cover 14 and the housing 11 is gradually increased. While the display 20 is moving from the open position to the covered position, the angle of inclination between the protection cover 14 and the housing 11 is gradually decreased.

As shown in FIG. 8, the position of the camera module 63 is changed from the conventional position on the display 20 to the position on the host 10. Therefore, the size of the display panel 22 in FIG. 1 can be increased. Moreover, when the display 20 is in the open position, the protection cover 14 is inclined relative to the housing 11, and thus the Camera module 63 can take a good shot of the user.

As shown in FIG. 2 to FIG. 4, in this embodiment, the laptop computer 1 further includes a first curved cover 40 and a second curved cover 50. The first curved cover 40 and the second curved cover 50 cover the rear side 112 of the host 10 and the rear side 212 of the display 20.

As shown in FIG. 5 and FIG. 7B, the first curved cover 40 and the second curved cover 50 are connected to or affixed to the rotation body 311 of the rotation element 31. The first curved cover 40 and the second curved cover 50 extend along the extension direction D1. A cross section of the first curved cover 40 and the second curved cover 50, which is perpendicular to the extension direction D1, is curved. The first curved cover 40 is separated from and parallel to the second curved cover 50. A gap G1 is formed between the first curved cover 40 and the second curved cover 50.

As shown in FIG. 7B, the laptop computer 1 further includes a transmission wire W1 connected to the host 10 and the display 20, and adjacent to the first curved cover 40 and the second curved cover 50. The transmission wire W1 is located in the gap G1.

The shapes of the first curved cover 40 and the second curved cover 50 correspond to the shape of the rotation element 31. Therefore, with the first curved cover 40 and/or the second curved cover 50, the appearance of the rear side 112 of the laptop computer 1 can be improved, and thus transmission wire W1 can be configured finely in the laptop computer 1.

In conclusion, the present disclosure integrates the host and the display using a hinge mechanism, so that the display can rotate relative to the host. When the display is in the open position, the protection cover is inclined relative to the housing, and the opening of the housing is exposed between the protection cover and the housing, and thus the heat dissipation efficiency of the host can be improved. Moreover, an electronic device can be disposed on the protection cover so as to add external functions to the host.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A laptop computer, comprising:
    a host comprising:
        a housing;
        a pivoting base disposed in the housing; and
        a protection cover that pivots on the pivoting base;
    a hinge mechanism connected to the host, and comprising:
        a first shaft disposed in the housing; and
        a connection element connected to the first shaft; and
    a display connected to the hinge mechanism, and being rotatable relative to the host via the hinge mechanism, wherein when the display is rotated relative to the host, the connection element is rotated with the first shaft, so as to make the protection cover rotate relative to the housing.

2. The laptop computer as claimed in claim 1, further comprising an electronic device disposed on the protection cover, and located in the housing.

3. The laptop computer as claimed in claim 2, wherein the protection cover comprises a light hole, and the electronic device comprises a camera module corresponding to the light hole.

4. The laptop computer as claimed in claim 2, further comprising a frame disposed on the protection cover, wherein the electronic device is located between the frame and the protection cover.

5. The laptop computer as claimed in claim 1, wherein while the display is moving from a covered position to an open position, an angle of inclination between the protection cover and the housing is gradually increased, and while the display is moving from the open position to the covered position, the angle of inclination between the protection cover and the housing is gradually decreased.

6. The laptop computer as claimed in claim 1, wherein when the display is in a covered position, the protection cover covers an opening of the housing, and when the display is in an open position, the protection cover is inclined relative to the housing, and the opening is exposed between the protection cover and the housing.

7. The laptop computer as claimed in claim 1, wherein the host further comprises a base disposed in the housing, and has a curved groove, and the hinge mechanism further comprises:
- a rotation element comprising a curved portion in the curved groove; and
- a second shaft connected to the connection element and the rotation element, and extending parallel to the first shaft,
wherein when the display is rotated relative to the host, the curved portion is rotated relative to the curved groove along a curved path.

8. The laptop computer as claimed in claim 7, wherein the curved path is a circular path, and the curved groove and the curved portion are C-shaped.

9. The laptop computer as claimed in claim 7, wherein the hinge mechanism further comprises:
- a fixed element that pivots on the first shaft, and is affixed to the housing; and
- a plurality of torque elements disposed on the first shaft, and configured to provide a torque force between the first shaft and the fixed element.

10. The laptop computer as claimed in claim 7, further comprising:
- a first curved cover connected to the rotation element;
- a second curved cover connected to the rotation element, wherein a gap is formed between the first curved cover and the second curved cover; and
- a transmission wire connected to the host and the display, and located in the gap.

* * * * *